United States Patent
Amma et al.

(10) Patent No.: US 7,727,356 B2
(45) Date of Patent: Jun. 1, 2010

(54) POLYARENEAZOLE/WOOD PULP AND METHODS OF MAKING SAME

(75) Inventors: Achim Amma, Richmond, VA (US); Mikhail R. Levit, Glen Allen, VA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 359 days.

(21) Appl. No.: 11/639,549

(22) Filed: Dec. 15, 2006

(65) Prior Publication Data
US 2007/0137817 A1   Jun. 21, 2007

Related U.S. Application Data

(60) Provisional application No. 60/752,282, filed on Dec. 21, 2005.

(51) Int. Cl.
   D21F 11/00   (2006.01)
   D21H 13/10   (2006.01)
(52) U.S. Cl. ............... 162/157.3; 162/141; 523/149
(58) Field of Classification Search .......... 162/141, 162/157.3; 523/149
   See application file for complete search history.

(56) References Cited

U.S. PATENT DOCUMENTS

| | | | |
|---|---|---|---|
| 3,063,966 A | 11/1962 | Kwolek et al. | |
| 3,133,138 A | 5/1964 | Alexander, Jr. | |
| 3,767,756 A | 10/1973 | Blades | |
| 3,869,430 A | 3/1975 | Blades | |
| 4,060,451 A | 11/1977 | Uchiyama et al. | |
| 4,472,241 A | 9/1984 | Provost | |
| 4,533,724 A * | 8/1985 | Wolfe et al. | ............ 528/313 |
| 5,674,969 A * | 10/1997 | Sikkema et al. | ............ 528/183 |
| 2003/0022961 A1 * | 1/2003 | Kusaka et al. | ............ 523/152 |

FOREIGN PATENT DOCUMENTS

| | | | |
|---|---|---|---|
| CN | 1683712 A | * | 10/2005 |
| EP | 0792967 A | | 9/1997 |
| GB | 1520574 A | | 8/1978 |
| JP | 06-240596 A | * | 8/1994 |
| WO | WO 93/17856 | * | 9/1993 |

OTHER PUBLICATIONS

Research Disclosure 19037.

* cited by examiner

*Primary Examiner*—Eric Hug
*Assistant Examiner*—Jacob Thomas Minskey

(57) ABSTRACT

The present invention relates to wood pulp and polyareneazole pulp for use as reinforcement material in products including for example friction materials, fluid sealing materials, and papers. The pulp comprises (a) irregularly shaped, wood pulp fibrous structures, (b) irregularly shaped, polyareneazole fibrous structures, and (c) water, whereby wood pulp fibrils and/or stalks are substantially entangled with polyareneazole fibrils and/or stalks. The invention further relates to processes for making such wood pulp and polyareneazole pulp.

12 Claims, 3 Drawing Sheets

POLYARENEAZOLE/WOOD PULP AND METHODS OF MAKING SAME

BACKGROUND OF THE INVENTION

1. Field of the Invention

This invention relates to wood pulp and polyareneazole pulp for use as a reinforcement material in products including for example friction materials, fluid sealing materials, and papers. The invention further relates to processes for making such pulp.

2. Description of Related Art

Fibrous and non fibrous reinforcement materials have been used for many years in friction products, fluid sealing products and other plastic or rubber products. Such reinforcement materials typically must exhibit high wear and heat resistance.

Asbestos fibers have historically been used as reinforcement materials, but due to their health risks, replacements have been made or proposed. However, many of these replacements do not perform as well as asbestos in one way or another.

Research Disclosure 74-75, published February 1980, discloses the manufacture of pulp made from fibrillated KEVLAR® brand para-aramid fibers of variable lengths and use of such pulp as a reinforcement material in various applications. This publication discloses that pulp made from KEVLAR® brand para-aramid fibers can be used in sheet products alone, or in combination with fibers of other materials, such as NOMEX® brand meta-aramid, wood pulp, cotton and other natural cellulosics, rayon, polyester, polyolefin, nylon, polytetrafluoroethylene, asbestos and other minerals, fiberglass and other, ceramics, steel and other metals, and carbon. The publication also discloses the use of pulp from KEVLAR® brand para-aramid fiber alone, or with KEVLAR® brand para-aramid short staple, in friction materials to replace a fraction of the asbestos volume, with the remainder of the asbestos volume being replaced by fillers or other fibers.

U.S. Patent Application Publication 2003/0022961 (to Kusaka et al.) discloses friction materials made from a friction modifier, a binder and a fibrous reinforcement made of a mixture of (a) a dry aramid pulp and (b) wet aramid pulp, wood pulp or acrylic fiber pulp. Dry aramid pulp is defined as an aramid pulp obtained by "the dry fibrillation method". The dry fibrillation method is dry milling the aramid fibers between a rotary cutter and a screen to prepare the pulp. Wet aramid pulp is defined as an aramid pulp obtained by "the wet fibrillation method". The wet fibrillation method is milling short aramid fibers in water between two rotary discs to form fibrillated fibers and then dehydrating the fibrillated fibers, i.e., the pulp. Kusaka et al further disclose a method of mix-fibrillating fibers by first mixing plural types of organic fibers that fibrillate at a definite ratio, and then fibrillating the mixture to produce a pulp.

Polypyridobisimidazole polymer is a rigid rod polymer. Fiber made from this polymer (such as the polymer composition, which is referred to as PIPD and is known as the polymer used to make M5® fiber) is known to be useful in both cut and flame resistant protective apparel. Rigid-rod polymer fibers having strong hydrogen bonds between polymer chains, e.g., polypyridobisimidazoles, have been described in U.S. Pat. No. 5,674,969 to Sikkema et al. An example of a polypyridobisimidazole is poly(1,4-(2,5-dihydroxy)phenylene-2,6-pyrido[2,3-d:5,6-d']bisimidazole), which can be prepared by the condensation polymerization of tetraaminopyridine and 2,5-dihydroxyterephthalic acid in polyphosphoric acid. Sikkema discloses that pulp can be made from these fibers. Sikkema also describes that in making one- or two-dimensional objects, such as fibers, films, tapes, and the like, it is desired that polypyridobisimidazoles have a high molecular weight corresponding to a relative viscosity ("Vrel" or "hrel") of at least about 3.5, preferably at least about 5, and more particularly equal to or higher than about 10, when measured at a polymer concentration of 0.25 g/dl in methane sulfonic acid at 25° C. Sikkema also discloses that good fiber spinning results are obtained with poly[pyridobisimidazole-2,6-diyl(2,5-dihydroxy-p-phenylene)] having relative viscosities greater than about 12, and that relative viscosities of over 50 (corresponding to inherent viscosities greater than about 15.6 dl/g) can be achieved.

There is an ongoing need to provide alternative pulps that both perform well in products and that are low in cost. Despite the numerous disclosures proposing lower cost alternative reinforcement materials, many of these proposed products do not adequately perform in use, cost significantly more than currently commercial products, or have other negative attributes. As such, there remains a need for reinforcement materials that exhibit high wear and heat resistance, and that are comparable or less expensive than other commercially available reinforcement materials.

BRIEF SUMMARY OF THE INVENTION

One embodiment of this invention relates to a pulp for use as reinforcement or processing material, comprising:
- (a) irregularly shaped, fibrillated wood pulp fibrous structures, the structures being 60 to 97 weight percent of the total solids;
- (b) irregularly shaped, fibrillated polyarenazole fibrous structures being 3 to 40 weight percent of the total solids; and
- (c) water, the wood pulp and the polyarenazole fibrous structures having an average maximum dimension of no more than 5 mm, a length-weighted average length of no more than 1.3 mm, and stalks and fibrils where the wood pulp fibrils and/or stalks are substantially entangled with the polyarenazole fibrils and/or stalks.

Another embodiment of this invention is a process for making a fibrillated wood pulp and polyarenazole pulp for use as reinforcement material, comprising:
- (a) combining pulp ingredients including:
  - (1) wood pulp fiber having an average length of no more than 1 cm and being 60 to 97 weight percent of the total solids in the ingredients;
  - (2) rigid rod polyarenazole fiber having an average length of no more than 10 cm and being 3 to 40 weight percent of the total solids in the ingredients; and
  - (3) water being 95 to 99 weight percent of the total ingredients;
- (b) mixing the ingredients to a substantially uniform slurry;
- (c) co-refining the slurry by simultaneously:
  - (1) fibrillating, cutting and masticating the fibrillated wood pulp fiber and the polyarenazole fiber to irregularly shaped fibrillated fibrous structures with stalks and fibrils; and
  - (2) dispersing all solids such that the refined slurry is substantially uniform; and
- (d) removing water from the refined slurry, thereby producing a fibrillated wood pulp and polyarenazole pulp with the fibrillated wood pulp and the polyarenazole fibrous structures having an average maximum dimension of no more than 5 mm, a length-weighted average length of no more than 1.3 mm, and the fibrillated wood pulp fibrils and/or stalks are substantially entangled with the polyarenazole fibrils and/or stalks.

Still another embodiment of this invention is a process for making an fibrillated wood pulp and polyarenazole pulp for use as reinforcement and processing material, comprising:

(a) combining ingredients including water and a first fiber from the group consisting of:
  (1) wood pulp fiber being 60 to 97 weight percent of the total solids in the pulp; and
  (2) rigid rod polyarenazole fiber being 3 to 40 weight percent of the total solids in the pulp;
(b) mixing the combined ingredients to a substantially uniform suspension;
(c) refining the suspension in a disc refiner thereby cutting the fiber to have an average length of no more than 10 cm, and fibrillating and masticating at least some of the fiber to irregularly shaped fibrillated fibrous structures;
(d) combining ingredients including the refined suspension, the second fiber of the group of (a)(1 and 2) having an average length of no more than 10 cm, and water, if necessary, to increase the water concentration to 95-99 weight percent of the total ingredients;
(e) mixing the ingredients, if necessary, to form a substantially uniform suspension;
(d) co-refining the mixed suspension by simultaneously:
  (1) fibrillating, cutting and masticating solids in the suspension such that all or substantially all of the wood pulp and polyarenazole fiber is converted to irregularly shaped fibrillated wood pulp and polyarenazole fibrous structures with stalks and fibrils; and
  (2) dispersing all solids such that the refined slurry is substantially uniform; and
(f) removing water from the refined slurry, thereby producing an wood pulp and polyarenazole pulp with the fibrillated wood pulp and the polyarenazole fibrous structures having an average maximum dimension of no more than 5 mm, a length-weighted average length of no more than 1.3 mm, and the wood pulp fibrils and/or stalks are substantially entangled with the polyarenazole fibrils and/or stalks.

In some embodiments this invention is further directed to friction materials, fluid sealing materials, and papers comprising the pulp of the present invention.

BRIEF DESCRIPTION OF THE DRAWING(S)

The invention can be more fully understood from the following detailed description thereof in connection with accompanying drawings described as follows.

GLOSSARY

Figure 1:
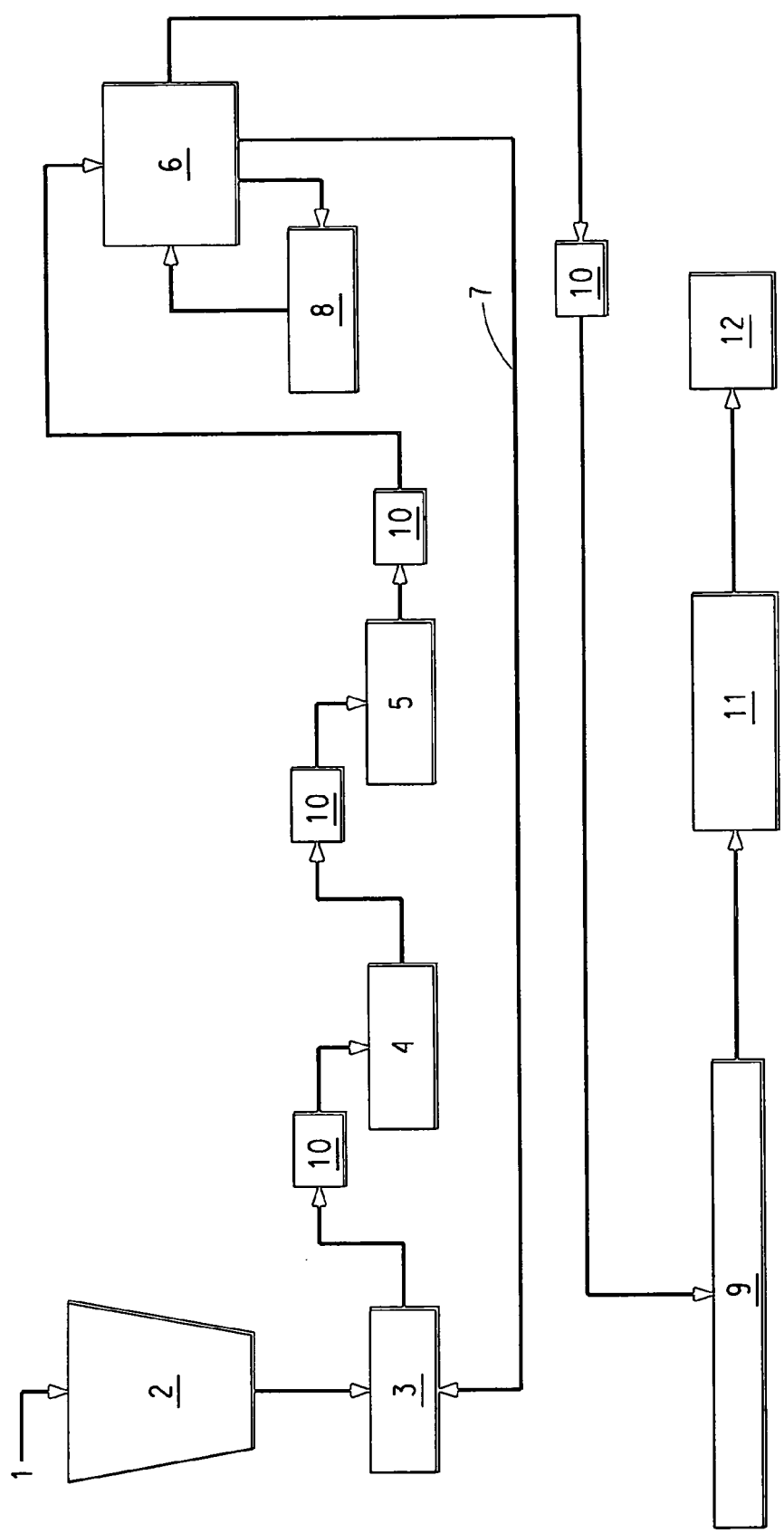
FIG. 1 is a block diagram of apparatus for performing a wet process for making "wet" pulp in accordance with the present invention.

Before the invention is described, it is useful to define certain terms in the following glossary that will have the same meaning throughout this disclosure unless otherwise indicated.

"Fiber" means a relatively flexible, unit of matter having a high ratio of length to width across its cross-sectional area perpendicular to its length. Herein, the term "fiber" is used interchangeably with the term "filament" or "end". The cross section of the filaments described herein can be any shape, but are typically circular or bean shaped. Fiber spun onto a bobbin in a package is referred to as continuous fiber or continuous filament or continuous filament yarns. Fiber can be cut into short lengths called staple fiber. Fiber can be cut into even smaller lengths called floc. Yarns, multifilament yarns or tows comprise a plurality of fibers. Yarn can be intertwined and/or twisted.

"Fibril" means a small fiber having a diameter as small as a fraction of a micrometer to a few micrometers and having a length of from about 10 to 100 micrometers. Fibrils generally extend from the main trunk of a larger fiber having a diameter of from 4 to 50 micrometers. Fibrils act as hooks or fasteners to ensnare and capture adjacent material. Some fibers fibrillate, but others do not or do not effectively fibrillate and for purposes of this definition such fibers do not fibrillate.

"Fibrillated fibrous structures" means particles of material having a stalk and fibrils extending therefrom wherein the stalk is generally columnar and about 10 to 50 microns in diameter and the fibrils are hair-like members only a fraction of a micron or a few microns in diameter attached to the stalk and about 10 to 100 microns long.

"Floc" means short lengths of fiber, shorter than staple fiber. The length of floc is about 0.5 to about 15 mm and a diameter of 4 to 50 micrometers, preferably having a length of 1 to 12 mm and a diameter of 8 to 40 micrometers. Floc that is less than about 1 mm does not add significantly to the strength of the material in which it is used. Floc or fiber that is more than about 15 mm often does not function well because the individual fibers may become entangled and cannot be adequately and uniformly distributed throughout the material or slurry. Aramid floc is made by cutting aramid fibers into short lengths without significant or any fibrillation, such as those prepared by processes described in U.S. Pat. Nos. 3,063,966, 3,133,138, 3,767,756, and 3,869,430. "Arithmetric" length means the calculated length from the following formula:

$$\text{Arithmetric length} = \frac{\sum[(\text{Each Individual pulp length})]}{\sum[\text{Individual pulp count}]}$$

"Length-weighted average" length means the calculated length from the following formula:

$$\text{Length-weighted average length} = \frac{\sum[(\text{Each Individual pulp length})^2]}{\sum[\text{Each Individual pulp length}]}$$

"Weight-weighted average" length means the calculated length from the following formula:

$$\text{Weight-weighted average length} = \frac{\sum[(\text{Each Individual pulp length})^3]}{\sum[(\text{Each Individual pulp length})^2]}$$

"Maximum dimension" of an object means the straight distance between the two most distal points from one another in the object "Staple fiber" can be made by cutting filaments into lengths of no more than 15 cm, preferably 3 to 15 cm; and most preferably 3 to 8 cm. The staple fiber can be straight (i.e., non crimped) or crimped to have a saw tooth shaped crimp along its length, with any crimp (or repeating bend) frequency. The fibers can be present in uncoated, or coated, or otherwise pretreated (for example, pre-stretched or heat-treated) form.

DETAILED DESCRIPTION OF THE INVENTION

This invention is directed to polyareneazole and wood pulp fiber pulp that has use in friction materials, fluid sealing materials, and papers, and other materials that incorporate this pulp. The invention is also directed to processes for making a polyareneazole and wood pulp fiber pulp.

I. First Embodiment Of The Inventive Process

In a first embodiment, the process for making a wood pulp fiber and polyareneazole pulp comprises the following steps. First, pulp ingredients are combined, added or contacted together. Second, the combined pulp ingredients are mixed to a substantially uniform slurry. Third, the slurry is simultaneously refined or co-refined. Fourth, water is removed from the refined slurry.

Combining Step

In the combining step, the pulp ingredients are preferably added together in a container. In a preferred embodiment the pulp ingredients include (1) wood pulp fiber, (2) polyareneazole fiber, (3) optionally other additives, and (4) water.

Wood Pulp Fiber

The wood pulp fiber is added to a concentration of 60 to 97 wt % of the total solids in the ingredients and preferably 60 to 75 wt % of the total solids in the ingredients.

The wood pulp fiber preferably has a coarseness of no more than 50 mg per 100 meters of length. In a preferred embodiment the coarseness is about 12 to 25 mg per 100 meters of length. Fiber coarseness is defined as the mass of oven dried weight of pulp in mg divided by the total contour fiber length of all the fibers as measured using a FQA tabletop analyzer Fiber Quality Analyzer (sold by OpTest Equipment Inc., 900 Tupper St., Hawkesbury, ON, K6A 3S3 Canada)

In some embodiments, the wood pulp fiber has an average length of no more than 1 cm. The wood pulp fiber preferably also has an average length of not more than about 5 mm.

"Wood pulp" as used herein refers to the product of boiling wood chips with alkaline liquors or solutions of acidic or neutral salts followed by bleaching with chlorine compounds, the object being to remove more or less completely the hemicelluloses and lignin incrustants of the wood. Kraft pulp is a type of wood pulp and the method for making it involves cooking (digesting) wood chips in an alkaline solution for several hours during which time the chemicals attack the lignin in the wood. The dissolved lignin is later removed leaving behind the cellulose fibers. Unbleached kraft pulp is dark brown in color, so before it can be used in many paper-making applications it is typically bleached to lighten the color.

In some embodiments, the wood pulp of this invention includes lyocell fibers and other fibers or fibrous structures that are obtained from cellulose with additional or different processing than described above Polyareneazole Fiber The polyareneazole fiber is added to a concentration of 3 to 40 wt % of the total solids in the ingredients, and preferably 25 to 40 wt % of the total solids in the ingredients. The polyareneazole fiber preferably has a linear density of no more than 10 dtex and more preferably 0.8 to 2.5 dtex. The polyareneazole fiber also preferably has an average length along its longitudinal axis of no more than 10 cm, more preferably an average length of 0.65 to 2.5 cm, and most preferably an average length of 0.65 to 1.25 cm.

Polyarenazole Polymer

Polymers suitable for use in making the polyarenazole fiber must be of fiber-forming molecular weight in order to be shaped into fibers. The polymers can include homopolymers, copolymers, and mixtures thereof As defined herein, "polyareneazole" refers to polymers having either:

one heteroaromatic ring fused with an adjacent aromatic group (Ar) of repeating unit structure (a):

(a)

with N being a nitrogen atom and Z being a sulfur, oxygen, or NR group with R being hydrogen or a substituted or unsubstituted alkyl or aryl attached to N; or two hetero aromatic rings each fused to a common aromatic group (Ar$^1$) of either of the repeating unit structures (b1 or b2):

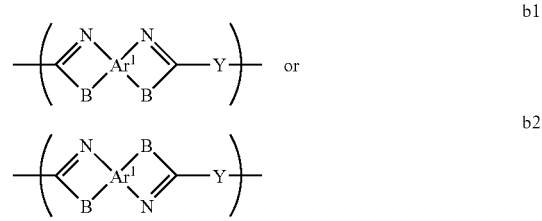

wherein N is a nitrogen atom and B is an oxygen, sulfur, or NR group, wherein R is hydrogen or a substituted or unsubstituted alkyl or aryl attached to N. The number of repeating unit structures represented by structures (a), (b1), and (b2) is not critical. Each polymer chain typically has from about 10 to about 25,000 repeating units. Polyareneazole polymers include polybenzazole polymers and/or polypyridazole polymers. In certain embodiments, the polybenzazole polymers comprise polybenzimidazole or polybenzobisimidazole polymers. In certain other embodiments, the polypyridazole polymers comprise polypyridobisimidazole or polypyridoimidazole polymers. In certain preferred embodiments, the polymers are of a polybenzobisimidazole or polypyridobisimidazole type.

In structure (b1) and (b2), Y is an aromatic, heteroaromatic, aliphatic group, or nil; preferably an aromatic group; more preferably a six-membered aromatic group of carbon atoms. Still more preferably, the six-membered aromatic group of carbon atoms (Y) has para-oriented linkages with two substituted hydroxyl groups; even more preferably 2,5-dihydroxy-para-phenylene.

In structures (a), (b1), or (b2), Ar and $Ar^1$ each represent any aromatic or heteroaromatic group. The aromatic or heteroaromatic group can be a fused or non-fused polycyclic system, but is preferably a single six-membered ring. More preferably, the Ar or $Ar^1$ group is preferably heteroaromatic, wherein a nitrogen atom is substituted for one of the carbon atoms of the ring system or Ar or $Ar^1$ may contain only carbon ring atoms. Still more preferably, the Ar or $Ar^1$ group is heteroaromatic.

As herein defined, "polybenzazole" refers to polyareneazole polymer having repeating structure (a), (b1), or (b2) wherein the Ar or $Ar^1$ group is a single six-membered aromatic ring of carbon atoms. Preferably, polybenzazoles include a class of rigid rod polybenzazoles having the structure (b1) or (b2); more preferably rigid rod polybenzazoles having the structure (b1) or (b2) with a six-membered carbocyclic aromatic ring $Ar^1$. Such preferred polybenzazoles include, but are not limited to polybenzimidazoles (B=NR), polybenzthiazoles (B=S), polybenzoxazoles (B=O), and mixtures or copolymers thereof. When the polybenzazole is a polybenzimidazole, preferably it is poly(benzo[1,2-d:4,5-d']bisimidazole-2,6-diyl-1,4-phenylene). When the polybenzazole is a polybenzthiazole, preferably it is poly(benzo[1,2-d:4,5-d']bisthiazole-2,6-diyl-1,4-phenylene). When the polybenzazole is a polybenzoxazole, preferably it is poly(benzo[1,2-d:4,5-d']bisoxazole-2,6-diyl-1,4-phenylene).

As herein defined, "polypyridazole" refers to polyareneazole polymer having repeating structure (a), (b1), or (b2) wherein the Ar or $Ar^1$ group is a single six-membered aromatic ring of five carbon atoms and one nitrogen atom. Preferably, these polypyridazoles include a class of rigid rod polypyridazoles having the structure (b1) or (b2), more preferably rigid rod polypyridazoles having the structure (b1) or (b2) with a six-membered heterocyclic aromatic ring $Ar^1$. Such more preferred polypyridazoles include, but are not limited to polypyridobisimidazole (B=NR), polypyridobisthiazole (B=S), polypyridobisoxazole (B=O), and mixtures or copolymers thereof. Yet more preferred, the polypyridazole is a polypyridobisimidazole (B=NR) of structure:

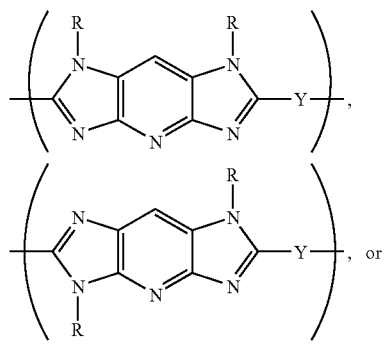

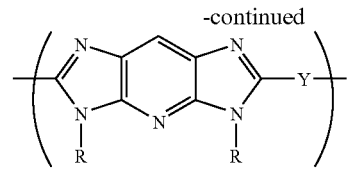

-continued wherein N is a nitrogen atom and R is hydrogen or a substituted or unsubstituted alkyl or aryl attached to N, preferably wherein R is H. The average number of repeat units of the polymer chains is typically in the range of from about from about 10 to about 25,000, more typically in the range of from about 100 to 1,000, even more typically in the range of from about 125 to 500, and further typically in the range of from about 150 to 300.

For the purposes of this invention, the relative molecular weights of the polyareneazole polymers are suitably characterized by diluting the polymer products with a suitable solvent, such as methane sulfonic acid, to a polymer concentration of 0.05 g/dl, and measuring one or more dilute solution viscosity values at 30° C. Molecular weight development of polyareneazole polymers of the present invention is suitably monitored by, and correlated to, one or more dilute solution viscosity measurements. Accordingly, dilute solution measurements of the relative viscosity ("Vrel" or "hrel" or "nrel") and inherent viscosity ("Vinh" or "hinh" or "ninh") are typically used for monitoring polymer molecular weight. The relative and inherent viscosities of dilute polymer solutions are related according to the expression $$Vinh=ln(Vrel)/C,$$

where ln is the natural logarithm function and C is the concentration of the polymer solution. Vrel is a unitless ratio of the polymer solution viscosity to that of the solvent free of polymer, thus Vinh is expressed in units of inverse concentration, typically as deciliters per gram ("dl/g"). Accordingly, in certain aspects of the present invention the polypyridoimidazole polymers are produced that are characterized as providing a polymer solution having an inherent viscosity of at least about 20 dl/g at 30° C. at a polymer concentration of 0.05 g/dl in methane sulfonic acid. Because the higher molecular weight polymers that result from the invention disclosed herein give rise to viscous polymer solutions, a concentration of about 0.05 g/dl polymer in methane sulfonic acid is useful for measuring inherent viscosities in a reasonable amount of time.

In some embodiments, this invention utilizes polyareneazole fiber that has an inherent viscosity of at least 20 dl/g; in other more preferred embodiments the inherent viscosity is of at least 25 dl/g; and in some most preferred embodiments the inherent viscosity is of at least 28 dl/g.

Optional Other Additives

Other additives can optionally be added as long as they stay suspended in the slurry in the mixing step and do not significantly change the effect of the refining step on the mandatory solid ingredients listed above. Suitable additives include pigments, dyes, anti-oxidants, flame-retardant compounds, and other processing and dispersing aids. Preferably, the pulp ingredients do not include asbestos. In other words, the resulting pulp is asbestos free or without asbestos.

Water

Water is added to a concentration of 95 to 99 wt % of the total ingredients, and preferably 97 to 99 wt % of the total ingredients. Further, the water can be added first. Then other ingredients can be added at a rate to optimize dispersion in the water while simultaneously mixing the combined ingredients.

Mixing Step

In the mixing step, the ingredients are mixed to a substantially uniform slurry. By "substantially uniform" is meant that random samples of the slurry contain the same wt % of the concentration of each of the starting ingredients as in the total ingredients in the combination step plus or minus 10 wt %, preferably 5 wt % and most preferably 2 wt %. For instance, if the concentration of the solids in the total mixture is 50 wt % wood pulp fiber plus 50 wt % polyareneazole fiber, then a substantially uniform mixture in the mixing step means each random sample of the slurry has (1) a concentration of the wood pulp fiber of 50 wt % plus or minus 10 wt %, preferably 5 wt % and most preferably 2 wt % and (2) a concentration of polyareneazole fiber of 50 wt % plus or minus 10 wt %, preferably 5 wt % and most preferably 2 wt %. The mixing can be accomplished in any vessel containing rotating blades or some other agitator. The mixing can occur after the ingredients are added or while the ingredients are being added or combined.

Refining Step

In the refining step the pulp ingredients are simultaneously co-refined, converted or modified as follows. The wood pulp fiber and the polyareneazole fiber are fibrillated, cut and masticated to irregularly shaped fibrous structures having stalks and fibrils. All solids are dispersed such that the refined slurry is substantially uniform. "Substantially uniform" is as defined above. The refining step preferably comprises passing the mixed slurry through one or more disc refiner, or recycling the slurry back through a single refiner. By the term "disc refiner" is meant a refiner containing one or more pair of discs that rotate with respect to each other thereby refining ingredients by the shear action between the discs. In one suitable type of disc refiner, the slurry being refined is pumped between closely spaced circular rotor and stator discs rotatable with respect to one another. Each disc has a surface, facing the other disc, with at least partially radially extending surface grooves. A preferred disc refiner that can be used is disclosed in U.S. Pat. No. 4,472,241. In a preferred embodiment, the plate gap setting for the disc refiner is a maximum of 0.18 mm and preferably the gap setting is 0.13 mm or lower, to a practical minimum setting of about 0.05 mm.

If necessary for uniform dispersion and adequate refining, the mixed slurry can be passed through the disc refiner more than once or through a series of at least two disc refiners. When the mixed slurry is refined in only one refiner, there is a tendency for the resulting slurry to be inadequately refined and non uniformly dispersed. Conglomerates or aggregates entirely or substantially of one solid ingredient, or the other, or both, can form rather than being dispersed forming a substantially uniform dispersion. Such conglomerates or aggregates have a greater tendency to be broken apart and dispersed in the slurry when the mixed slurry is passed through the refiner more than once or passed through more than one refiner. Optionally, the refined slurry may be passed through a screen to segregate long fibers or clumps, which may be recycled through one or more refiners until cut to acceptable lengths or concentration.

Because a substantially uniform slurry containing multiple ingredients is co-refined in this step of the process, any one type of pulp ingredient (for example, polyareneazole fiber) is refined into a pulp in the presence of all the other types of pulp ingredients (for example, wood pulp fiber) while those other ingredients are also being refined. This co-refining of pulp ingredients forms a pulp that is superior to a pulp blend generated by merely mixing two pulps together. Adding two pulps and then merely mixing them together does not form the substantially uniform and intimately connected fibrous components of the pulp generated by co-refining of pulp ingredients into pulp in accordance with the present invention.

Removing Step

Then water is removed from the refined slurry. The water can be removed by collecting the pulp on a dewatering device such as a horizontal filter, and if desired, additional water can be removed by applying pressure or squeezing the pulp filter cake. The dewatered pulp can optionally then be dried to a desired moisture content, and/or can be packaged or wound up on rolls. In some preferred embodiments, the water is removed to a degree that the resulting pulp can be collected on a screen and wound up into rolls. In some embodiments, no more than about 60 total wt % water being present is a desired amount of water and preferably 4 to 60 total wt % water. However, in some embodiments, the pulp can retain more water, so higher amounts of total water, as much as 75 total wt % water, will be present.

Figure 2:
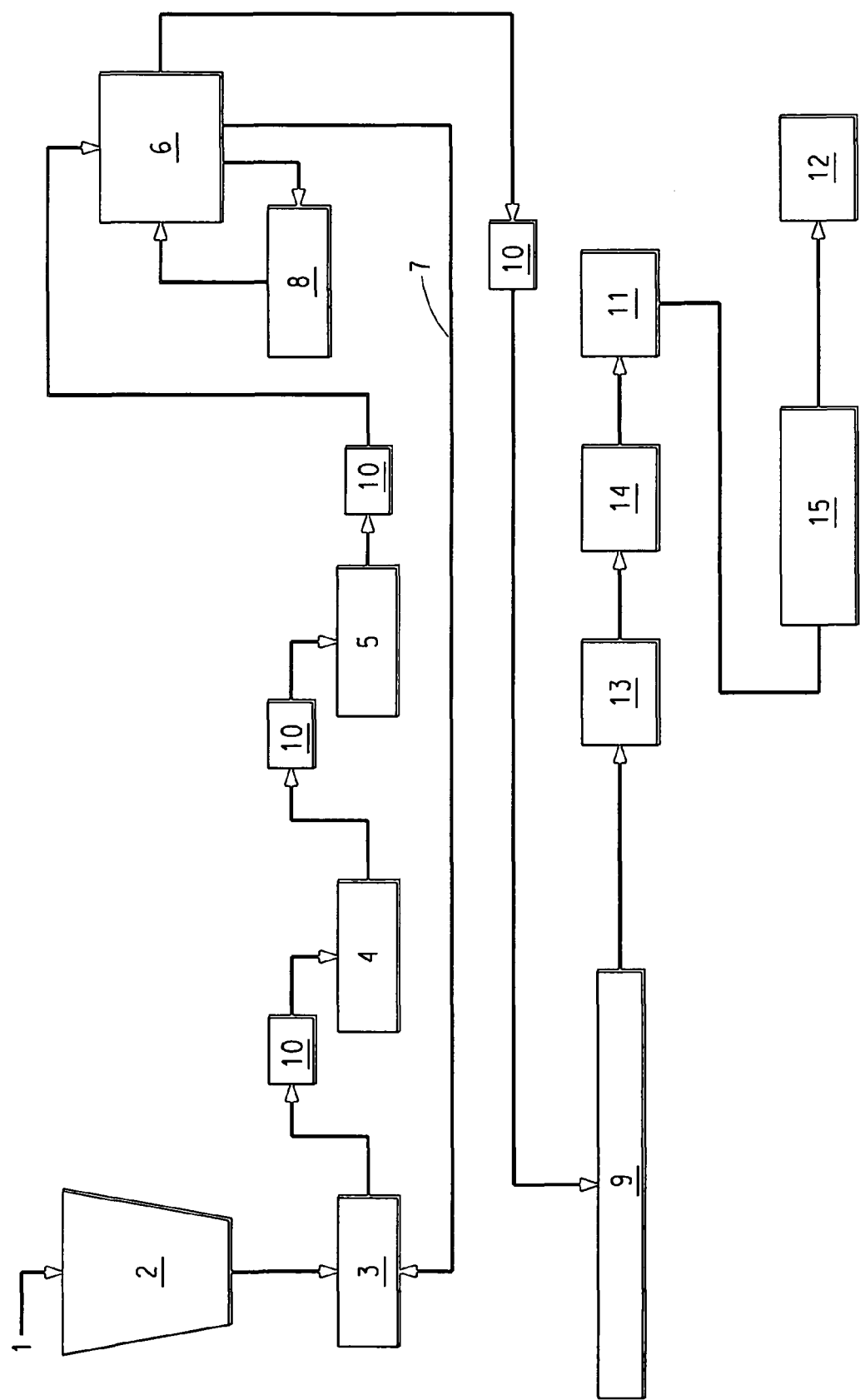
FIG. 2 is a block diagram of apparatus for performing a dry process for making "dry" pulp in accordance with the present invention.

FIGS. 1 and 2

This process will now be described in reference to FIGS. 1 and 2. Throughout this detailed description, similar reference characters refer to similar elements in all figures of the drawings.

Referring to FIG. 1, there is a block diagram of an embodiment of a wet process for making "wet" pulp in accordance with the present invention. Pulp ingredients 1 are added to container 2. Container 2 is provided with an internal mixer, similar to a mixer in a washing machine. The mixer disperses the ingredients into the water creating the substantially uniform slurry. The mixed slurry is transferred to a first refiner 3 that refines the slurry. Then, optionally, the refined slurry can be transferred to a second refiner 4, and optionally then to a third refiner 5. Three refiners are illustrated but any number of refiners can be used depending on the degree of uniformity and refining desired. After the last refiner in the series of refiners, the refined slurry is optionally transferred to a filter or sorter 6 that allows slurry with dispersed solids below a chosen mesh or screen size to pass and recirculates dispersed solids larger than a chosen mesh or screen size back to one or more of the refiners such as through line 7 or to a refiner 8 dedicated to refine this recirculated slurry from which refined slurry is again passed to the filter or sorter 6. Suitably refined slurry passes from the filter or sorter 6 to a horizontal water vacuum filter 9 that removes water. Slurry can be transferred from point to point by any conventional method and apparatus such as with the assistance of one or more pump 10. Then the pulp is conveyed to a dryer 11 that removes more water until the pulp has the desired concentration of water. Then the refined pulp is packaged in a baler 12.

Referring to FIG. 2, there is a block diagram of an embodiment of a dry process for making "dry" pulp in accordance with the present invention. This dry process is the same as the wet process except after the horizontal water vacuum filter 9. After that filter, the pulp goes through a press 13 that removes more water. Then the pulp goes through a fluffer 14 to fluff the pulp and then a dryer 11 to remove more water to the desired concentration. Then the pulp is passed through a rotor 15 and packaged in a baler 12.

II. Second Embodiment Of The Inventive Process

In a second embodiment, the process for making the wood pulp and polyareneazole pulp is the same as the first embodiment of the process described above with the following differences.

Prior to combining all ingredients together, either the wood pulp fiber or the polyareneazole fiber, or both the wood pulp fiber and the polyareneazole fiber, may need to be shortened. This is done by combining water with the fiber ingredient. Then the water and fiber are mixed to form a first suspension and processed through a first disc refiner to shorten the fiber. The disc refiner cuts the fiber to an average length of no more than 10 cm. The disc refiner will also partially fibrillate and partially masticate the fiber. The other fiber, that was not previously added, can be shortened this way too forming a second processed suspension. Then the other fiber (or the second suspension, if processed in water) is combined with the first suspension.

More water is added before or after, or when, other ingredients are added, if necessary, to increase the water concentration to 95-99 wt % of the total ingredients. After all ingredients are combined, they can be mixed, if necessary, to achieve a substantially uniform slurry.

The ingredients in the slurry are then co-refined together, i.e., simultaneously. This refining step includes fibrillating, cutting and masticating solids in the suspension such that all or substantially all of the wood pulp fiber and polyareneazole fiber is converted to irregularly shaped fibrillated fibrous structures. This refining step also disperses all solids such that the refined slurry is substantially uniform. Then water is removed as in the first embodiment of the process. Both processes produce the same or substantially the same wood pulp fiber and polyareneazole pulp.

The Inventive Pulp

The resulting product produced by the process of this invention is a wood pulp and polyareneazole pulp for use as reinforcement material in friction and fluid sealing products and papers. The pulp comprises (a) irregularly shaped, wood pulp fibrous structures, (b) irregularly shaped, polyareneazole fibrous structures, (c) optionally other minor additives, and (d) water.

The concentration of the separate ingredient components in the pulp correspond, of course, to the concentrations described beforehand of the corresponding ingredients used in making the pulp.

The irregularly shaped, wood pulp and polyareneazole fibrillated fibrous structures have stalks and fibrils. The wood pulp fibrils and/or stalks are substantially entangled with the polyareneazole fibrils and/or stalks. The fibrils are important and act as hooks or fasteners or tentacles that adhere to and hold adjacent particles in the pulp and final product thereby providing integrity to the final product.

The wood pulp and polyareneazole fibrillated fibrous structures preferably have an average maximum dimension of no more than 5 mm, more preferably 0.1 to 4 mm, and most preferably 0.1 to 3 mm. The wood pulp and polyareneazole fibrillated fibrous structures preferably have a length-weighted average of no more than 1.3 mm, more preferably 0.7 to 1.2 mm, and most preferably 0.75 to 1.1 mm.

In a preferred embodiment, the wood pulp and polyareneazole pulp is without substantial aggregates or conglomerates of the same material. Further, the pulp has a Canadian Standard Freeness (CSF) as measured per TAPPI test T 227 om-92, which is a measure of its drainage characteristics, of 100 to 700 ml, and preferably 250 to 450 ml.

Surface area of pulp is a measure of the degree of fibrillation and influences the porosity of the product made from the pulp. In some embodiments of this invention, the surface area of the pulp is 7 to 11 square meters per gram.

It is believed that the fibrillated fibrous structures, dispersed substantially homogeneously throughout the reinforcement material, and the friction and fluid sealing materials, provide, by virtue of the high temperature characteristics of the polyareneazole polymers and the fibrillation propensity of the polyareneazole fibers, many sites of reinforcement and increased wear resistance. When co-refined, the blending of the wood pulp and polyareneazole materials is so intimate that in a friction or fluid sealing material there is always some polyareneazole fibrous structures close to the wood pulp fiber structures, so the stresses and abrasion of service are always shared. Therefore, when co-refined, the wood pulp and the polyareneazole materials are in such intimate contact that in a friction or fluid sealing material there are always some polyareneazole fibrous structures close to the wood pulp fiber structures so the stresses and abrasion of service are always shared.

Friction Material

The pulp of the present invention can be used as a reinforcement material in friction materials. By "friction materials" is meant materials used for their frictional characteristics, such as coefficient of friction, to stop or transfer energy of motion, stability at high temperatures, wear resistance, noise and vibration damping properties, etc. Illustrative uses for friction materials include brake pads, brake blocks, dry clutch facings, clutch face segments, brake pad backing/insulating layers, automatic transmission papers, wet brake, and other industrial friction papers.

In view of this new use, the invention is further directed to friction material and processes for making the friction material. Specifically, the friction material comprises a friction modifier; optionally at least one filler; a binder; and a fibrous reinforcement material comprising the wood pulp and polyareneazole pulp of this invention. Suitable friction modifiers are metal powders such as iron, copper and zinc; abrasives such as oxides of magnesium and aluminum; lubricants, such as synthetic and natural graphites, and sulfides of molybdenum and zirconium; and organic friction modifiers such as synthetic rubbers and cashew nut shell resin particles. Suitable binders are thermosetting resins such as phenolic resins (i.e., straight (100%) phenolic resin and various phenolic resins modified with rubber or epoxy), melamine resins, epoxy resins and polyimide resins, and mixtures thereof. Suitable fillers include barite, whiting, limestone, clay, talc, various other magnesium-aluminum-silicate powders, wollastonite, attapulgite, and mixtures thereof.

The actual steps for making the friction material can vary, depending on the type of friction material desired. For example, methods for making molded friction parts generally involve combining the desired ingredients in a mold, curing the part, and shaping, heat treating and grinding the part if desired. Automotive transmission and friction papers generally can be made by combining the desired ingredients in a slurry and making a paper on a paper machine using conventional paper making processes.

Fluid Sealing Material

The invention is further directed to fluid sealing material and processes for making the fluid sealing materials. Fluid sealing materials are used in or as a barrier to prevent the discharge of fluids and/or gases and used to prevent the entrance of contaminants where two items are joined together. An illustrative use for fluid sealing material is in gaskets. The fluid sealing material comprises a binder; optionally at least one filler; and a fibrous reinforcement material comprising the wood pulp and polyareneazole pulp of this invention. Suitable binders include nitrile rubber, butadiene rubber, neoprene, styrene-butadiene rubber, nitrile-butadiene rubber, and mixtures thereof. The binder can be added with all other starting materials. The binder is typically added in the first step of the gasket production process, in which the dry ingredients are mixed together. Other ingredients optionally include uncured rubber particles and a rubber solvent, or a solution of rubber in solvent, to cause the binder to coat surfaces of the fillers and pulp. Suitable fillers include barium sulfate, clays, talc, and mixtures thereof.

Suitable processes for making fluid sealing materials are, for example, a beater-add process or wet process where the gasket is made from a slurry of materials, or by what is called a calendaring or dry process where the ingredients are combined in an elastomeric or rubber solution.

Many other applications of the pulp are possible, including its use as a component in papers, or its use as a filter material. When used as a paper or filter material typically the pulp of this invention is combined with a binder and a molded part or sheet or paper product is made by conventional methods.

Test Methods

The following test methods were used in the following Examples.

Canadian Standard Freeness (CSF) was measured as described in TAPPI method T 227 in conjunction with optical microscopy. CSF measures the drainage rate of a dilute pulp suspension. It is a useful test to assess the degree of fibrillation. Data obtained from conduct of that test are expressed as Canadian Freeness Numbers, which represent the milliliters of water that drain from an aqueous slurry under specified conditions. A large number indicates a high freeness and a high tendency for water to drain. A low number indicates a tendency for the dispersion to drain slowly. The freeness is inversely related to the degree of fibrillation of the pulp, since greater numbers of fibrils reduce the rate at which water drains through a forming paper mat.

Average fiber lengths, including Length-weighted average length, were determined using a Fiber Quality Analyzer (sold by OpTest Equipment Inc., 900 Tupper St., Hawkesbury, ON, K6A 3S3 Canada) following TAPPI test method T 271.

Temperature: All temperatures are measured in degrees Celsius (° C.).

Denier is measured according to ASTM D 1577 and is the linear density of a fiber as expressed as weight in grams of 9000 meters of fiber. The denier is measured on a Vibroscope from Textechno of Munich, Germany. Denier times (10/9) is equal to decitex (dtex).

EXAMPLES

This invention will now be illustrated by the following specific examples. All parts and percentages are by weight unless otherwise indicated. Examples prepared according to the process or processes of the current invention are indicated by numerical values. Comparative examples are indicated by letters.

The following examples illustrate the surprising increase in the degree of fibrillation of a wood pulp fiber by co-refining a small amount of polyarenazole fiber in the presence of the wood pulp fiber. The degree of fibrillation is an important characteristic of a pulp product. There is a direct relationship between degree of fibrillation and filler retention. In addition, fibrillation is useful to achieve uniform dispersion of the pulp products in a variety of materials. A highly fibrillated fiber will also be able to bond to a matrix more intensely through physical entanglement than a non-fibrillated fiber. In the examples that follow, poly(paraphenylene benzobisoxazole) (PBO) fiber was used as a representative of the polyarenazole fiber family and kraft pulp was used to represent wood pulp fibers.

Comparative Example A

This example illustrates prior art material that is made when wood pulp fiber is refined without any polyarenazole fiber being present.

Figure 3:
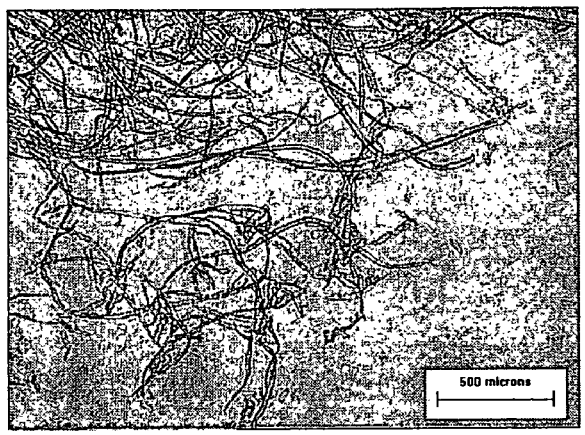
FIG. 3 is a digital optical micrograph of the prior art material that is made when wood pulp is refined without any polyareneazole fiber being present.

68.1 grams of a hardwood pulp (Hawesville Hardwood, bleached Kraft pulp, sold by Weyerhaeuser Company PO Box 9777 Federal Way, Wash. 98063-9777) was dispersed in 2.7 L of water. The dispersion was passed 5 times through a Sprout-Wadron single-speed, 30 cm single disk refiner (sold by Andritz, Inc., Sprout-Bauer Equipment, Muncy, Pa. 17756) with the disk gap set to 0.13 mm. The properties of the as-produced 100% refined woodpulp are shown in Table 1; FIG. 3 is a digital optical micrograph of the material showing the limited fibrillation experienced by this material after refining.

A paper was then made from the refined material by dispersing with a standard pulp disintegrator (as described in Appendix A of TAPPI 205) 6.7 grams of the material (on a dry weight basis) in 1.5 L water for 3 min, adding the dispersion to a wet-laid paper mold having a screen with the dimensions of 21 cm×21 cm. The dispersion was then diluted with 5 L of water and a wet-laid paper was formed on the screen and excess water was removed with a rolling pin. The paper was then dried at 100° C. for 10 min in a paper dryer. The properties of the as-produced paper are shown in Table 2.

Comparative Example B

Figure 4:
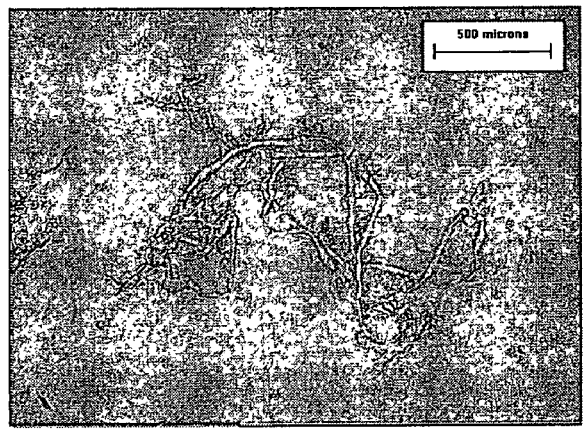
FIG. 4 is a digital optical micrograph of the fibrillation of PBO fiber after refining.

This example illustrates a 100% polyarenazole pulp. A 100% PBO pulp was produced using the same procedure as in Comparative Example A with the exception of using 68.1 grams of a 1.7 dtex PBO fiber having a cut length of 12.7 mm (sold by Toyobo Co., Ltd., Zylon Department, 2-2-8 Dojima-Hama, Kita-Ku Osaka) rather than wood pulp. The properties of the as-produced 100% PBO refined material are shown in Table 1; FIG. 4 is a digital optical micrograph of the pulp showing the fibrillation of the PBO fiber after refining. A paper was then made (as described in Comparative Example A) from the PBO refined material and properties of the as-produced paper are shown in Table 2.

Example 1

A pulp of this invention was produced using the same procedure as in Comparative Example A with the exception a dispersion containing a mixture of the starting unrefined cut fibers of Comparative Example A and the starting unrefined cut fibers of Comparative Example B was refined, passing 17 times through the disk refiner to form a co-refined pulp. The fiber mixture contained 61.7 grams of a hardwood pulp (Hawesville Hardwood, bleached Kraft pulp, sold by Weyerhaeuser Company PO Box 9777 Federal Way, Wash. 98063-9777) and 6.4 grams of 1.7 dtex PBO fiber having a cut length of 12.7 mm (sold by Toyobo Co., Ltd., Zylon Department, 2-2-8 Dojima-Hama, Kita-Ku Osaka). Properties of the as-produced pulp are shown in Table 1. A paper was then made (as described in Comparative Example A) from the pulp and properties of the as-produced paper are shown in Table 2.

Example 2

Figure 5:
FIG. 5 is a digital optical micrograph of the fibrillation of PBO and wood pulp after co-refining.

Another pulp of this invention was produced using the same procedure as in Example 1 with the exception the mixture contained 50.8 grams of the hardwood pulp and 17.3 grams of the 1.7 dtex PBO fiber. The co-refined pulp had approximately 25 weight percent PBO and 75 weight percent wood pulp. The properties of the as-produced pulp are shown in Table 1; FIG. 5 is a digital optical micrograph of the pulp showing the fibrillation of both the PBO and wood pulp fiber after refining. A paper was then made (as described in Comparative Example A) from the pulp and properties of the as-produced paper are shown in Table 2.

Comparative Example C

This example demonstrates that refining the wood pulp fibers separately from the polyareneazole fibers and then mixing them together results in a pulp that provides a paper having lower tensile strength (and therefore less fibrillation) than a paper made from the co-refined pulp of this invention.

A sample of the refined material made in Comparative Example A was mixed with a sample of the refined material of Comparative Example B in an amount of 75 wt % wood pulp material to 25% wt % PBO material (dry weight basis) using a standard disintegrator as described in Appendix A of TAPI 205 for 5 min. The TAPPI disintegrator was used to mix the two refined pulps of Comparative Examples A and B because the agitation is vigorous enough to mix and disperse the previously refined pulps well, but it would not change their length or fibrillation. The properties of the as-produced pulp are shown in Table 1. A paper was then made (as described in Comparative Example A) from the pulp and properties of the as-produced paper are shown in Table 2.

The 100% refined wood pulp material as described in Comparative Example A results in high CSF values. With the addition of PBO to wood pulp and corefining, the resulting pulp displays a drop in the CSF values. This effect is clearly observable in Example 2, where 25/75 PBO/woodpulp co-refined pulp was made and is shown in the optical micrograph that is FIG. 6. The CSF value obtained with this sample is dramatically different from the CSF value obtained by mixing pulp from Comparative Example A (100% PBO) and B (100% wood pulp) in a 75/25 dry weight basis ratio as described in Example 2. These examples demonstrate the beneficial effect of co-refining wood pulp with PBO versus mixing of pulp products in conventional mixing equipment.

The fiber length averages of the pulp products produced in the Examples are listed in Table 1. It is interesting to note that the co-refined samples of this invention (Examples 1 and 2) have a shorter fiber length than the pulp produced in Comparative Example C. This demonstrates that by co-refining PBO with wood pulp, very different types of pulp products are produced that cannot be achieved by merely mixing PBO pulp with wood pulp.

Table 2 summarizes modulus and tenacity results obtained from the hand sheet papers made in the Examples. Examples 1 and 2 show most impressive and surprising data: the papers formed exceed the modulus and tenacity properties of a pulp made by simply mixing the pulps in a 75/25 ratio (Comparative Example C) and in some cases surpass even the single-material papers of Comparative Examples A and B. As Comparative Example C demonstrates, these results can only be achieved when PBO and wood pulp are processed together. Simply mixing wood and PBO pulp does not resolve in any benefit over 100% wood pulp paper.

TABLE 1

| Pulp | Wt % wood pulp | Wt % PBO | CSF [mL] | Arithm. mean length [mm] | Length weighted mean length [mm] | Weight weighted mean length [mm] |
|---|---|---|---|---|---|---|
| A | 100 | 0 | 675 | 0.382 | 0.891 | 1.318 |
| B | 0 | 100 | 670 | 0.209 | 1.174 | 2.691 |
| 1 | 91 | 9 | 692 | 0.402 | 0.907 | 1.342 |
| 2 | 75 | 25 | 498 | 0.351 | 0.862 | 1.448 |
| C | 75 | 25 | 695 | 0.404 | 1.041 | 1.783 |

TABLE 2

| Pulp from example | Wt % wood pulp | Wt % PBO | Tensile Strength [N/cm] | Young's Modulus [MPa] | Density [g/cc] | Basis Weight [g/m²] |
|---|---|---|---|---|---|---|
| A | 100 | 0 | 8.12 | 232.48 | 0.27 | 164.17 |
| B | 0 | 100 | 0.23 | 1.18 | 0.23 | 138.98 |
| 1 | 91 | 9 | 7.39 | 178.11 | 0.24 | 160.50 |
| 2 | 75 | 25 | 18.78 | 419.99 | 0.26 | 157.83 |
| C | 75 | 25 | 5.25 | 139.93 | 0.24 | 157.63 |

Example 3

This example illustrates how the pulp of this invention can be incorporated into a beater-add gasket for fluid sealing applications. Water, rubber, latex, fillers, chemicals, and the pulp of this invention are combined in desired amounts to form a slurry. On a circulating wire sieve (such as a paper machine screen or wire), the slurry is largely drained of its water content, is dried in a heating tunnel, and is vulcanized on heated calendar rolls to form a material having a maximum thickness of around 2.0 mm. This material is compressed in a hydraulic press or two-roll calendar, which increases the density and improves sealability.

Such beater-add gasket materials generally do not have as good sealability as equivalent compressed-fiber materials and are best suited for moderate-pressure high-temperature applications. Beater-add gaskets find applicability in the making of auxiliary engine gaskets or, after further processing, cylinder head gaskets. For this purpose, the semi-finished product is laminated onto both sides of a spiked metal sheet and is physically fixed in place by the spikes.

Example 4

This example illustrates how the pulp of this invention can be incorporated into a gasket made by a calendaring process. The same ingredients as in Example 3, minus the water, are thoroughly dry mixed together and are then blended with a rubber solution prepared using an appropriate solvent.

After mixing, the compound is then generally conveyed batchwise to a roll calendar. The calendar consists of a small roll that is cooled and a large roll that is heated. The compound is fed and drawn into the calendar nip by the rotary movement of the two rolls. The compound will adhere and wrap itself around the hot lower roll in layers generally about 0.02 mm thick, depending on the pressure, to form a gasketing material made from the built-up compound layers. In so doing, the solvent evaporates and vulcanization of the elastomer commences.

Once the desired gasketing material thickness is reached, the rolls are stopped and the gasketing material is cut from the hot roll and cut and/or punched to the desired size. No additional pressing or heating is required, and the material is ready to perform as a gasket. In this manner gaskets up to about 7 mm thick can be manufactured. However, most gaskets made in this manner are much thinner, normally being about 3 mm or less in thickness.

What is claimed is:

1. A pulp for use as reinforcement or processing material, comprising:
   (a) fibrillated wood pulp fibrous structures, the structures being 60 to 97 weight percent of the total solids;
   (b) fibrillated polyarenazole fibrous structures being 3 to 40 weight percent of the total solids;
   the wood pulp and the polyarenazole fibrous structures being without substantial aggregates or conglomerates of the same material and having an average maximum dimension of no more than 5 mm, a length-weighted average length of 0.7 mm to 1.3 mm, and stalks and fibrils where the wood pulp fibrils and/or stalks are substantially entangled with the polyarenazole fibrils and/or stalks.

2. The pulp of claim 1, wherein the wood pulp fibrous structures are about 60 to 75 weight percent of the total solids.

3. The pulp of claim 1, wherein the polyarenazole fibrous structures are about 25 to 40 weight percent of the total solids.

4. The pulp of claim 1 having a Canadian Standard Freeness (CSF) of 100 to 700 ml.

5. The pulp of claim 1, wherein the polyarenazole is a rigid rod polybenzazole or rigid rod polypyridazole polymer.

6. The pulp of claim 5, wherein the polybenzazole is a polybenzobisoxazole.

7. The pulp of claim 5, wherein the polypyridazole is a polypyridobisimidazole.

8. A friction material, comprising:
   a friction modifier;
   a binder; and
   a fibrous reinforcement material comprising the pulp of claim 1.

9. The friction material of claim 8, wherein
   the friction modifier is selected from the group consisting of metal powders, abrasives, lubricants, organic friction modifiers, and mixtures thereof; and
   the binder is selected from the group consisting of wood pulping resins, melamine resins, epoxy resins and polyimide resins, and mixtures thereof.

10. A fluid sealing material, comprising:
    a binder; and
    a fibrous reinforcement material comprising the pulp of claim 1.

11. The fluid sealing material of claim 10, wherein the binder is selected from the group consisting of nitrile rubber, butadiene rubber, neoprene, styrene butadiene rubber, nitrile-butadiene rubber, and mixtures thereof.

12. A paper comprising the pulp of claim 1 and a binder.

* * * * *